R. J. RUTHS.
PNEUMATIC TIRE.
APPLICATION FILED SEPT. 10, 1908.

928,334.

Patented July 20, 1909.

Inventor
Robt. J. Ruths.
By
Stuart & Stuart
Attorneys

UNITED STATES PATENT OFFICE.

ROBERT J. RUTHS, OF BALTIMORE, MARYLAND.

PNEUMATIC TIRE.

No. 928,334.　　　Specification of Letters Patent.　　　Patented July 20, 1909.

Application filed September 10, 1908. Serial No. 452,419.

*To all whom it may concern:*

Be it known that I, ROBERT JAMES RUTHS, citizen of the United States of America, residing at Baltimore, Maryland, (post-office address 1050 North Broadway,) have invented certain new and useful Improvements in Pneumatic Tires, of which the following is a specification.

This invention relates to pneumatic tires of the type generally referred to as protected, or armored, and has as an object the production of such a tire, the tube of which is conveniently accessible for mending and which, at the same time, is amply protected against puncture and armed to prevent skidding, and may be applied to any wheel.

The tire consists of a tube of rubber inclosed within a cover composed of alternate layers of canvas and leather. Covering the tread of the tire is a ring called a tread ring built up of flat bands of leather encircling the outer periphery of the tire. Another ring, also of leather strips, called a grip ring, is secured to the back of the tire; i. e., its inner periphery, to furnish a grip for the rim. The whole is covered with canvas and leather in successive layers. The tread is protected by a strip of sheet metal flanged at its edges to inclose the tread, and spikes are passed through the strip into the leather and left with their heads protruding. Along the sides and back, the layers of canvas and leather are sewed together, forming the whole into an integral structure and leaving a pocket on the outer periphery of the tire for the tread ring. On the inner side, or back, the cover is split in the plane of rotation from the outside of the air tube to the rim dividing the grip ring into two circular strips, or rings. The rim is of the sectional variety, may be applied to any felly having a flat periphery, and has two flanges which separate to admit the grip ring. The flanges and grip are perforated transversely and bolts are passed through the two flanges and the grip, holding the sections of the grip ring together and securing the tire to the wheel.

Figure 1:
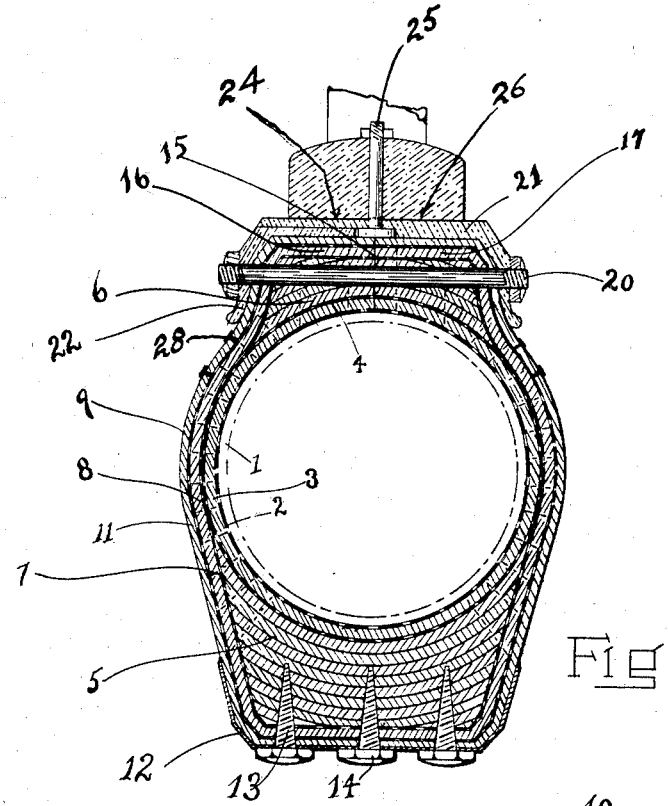
Figure 2:
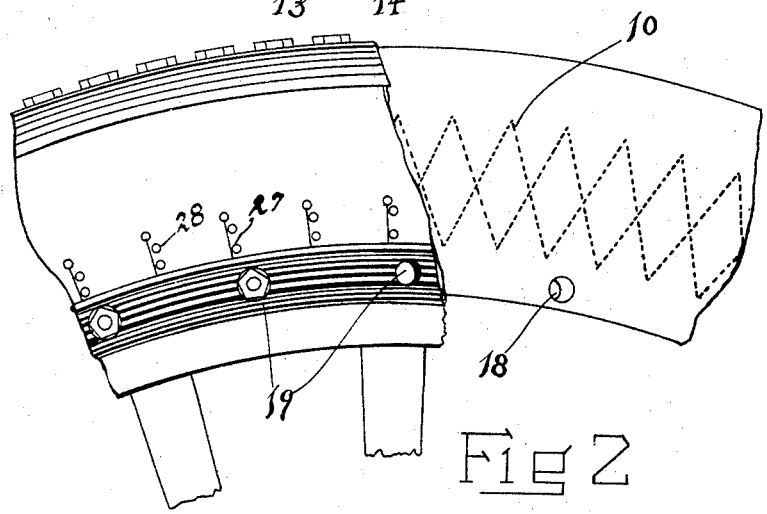

Referring to the accompanying drawing:—Figure 1 is a transverse cross-section of the tire and rim, Fig. 2 is a fragmentary side view with a part of the cover removed.

The inner tube 1 of the tire is of the usual type composed of rubber. This tube is covered with a layer of canvas 2 over which is a layer of leather 3 and a second layer of canvas 4. The tread is protected by a thick ring 5 of leather composed of a series of flat bands, the first of which is cemented to the canvas 4, the others of which are placed one upon the other in turn. This ring is tapered in cross-section from a width slightly less than the diameter of the layer 4 to the desired width of tread, in this case somewhat less than the inside diameter of the inner tube. To the inner periphery of the tire is attached the grip ring 6. This is also composed of a series of layers of leather bands superimposed one upon the other, the inner band being cemented to the canvas layer 4 and the others being superimposed one upon the other and attached to each other. A covering 7 of canvas incloses the whole, resting on the canvas coating 4 at the sides and covering the grip ring and the tread ring. Outside of this is a complete covering of leather 8 and another layer of canvas 9. At the sides the cover, meaning the portion outside the rubber tube 1, is sewed through and through from the canvas layer 9 to the canvas layer 2. These seams follow the lines indicated at 10 on Fig. 2. The grip ring is also sewed through and through as shown. It will be noted that the different layers of tire are firmly secured to each other at the sides, forming a peripheral pocket on the tread of the tire to inclose the tread ring 5. Over the whole is an external covering 11 of leather. This is cut away at 27 to provide for the removal of the surplus material and the slits are closed by fastening their edges to the canvas layer 9 by means of rivets 28. The tread is protected by a peripheral strip 12 of metal bent up for a short distance, possibly three-quarters of an inch, at each side, secured by means of spikes 13, the heads of which 14 are left protruding, as shown, to form a rough surface to prevent skidding.

The cover is divided at the rear centrally in the plane of revolution at 15, so that the gripping ring instead of being in fact a single ring is separated to form two rings 16 and 17. The rim 21 with which this tire is used is preferably of the type known as sectional; i. e., one flange 22 is removable. The grip ring is pierced transversely at points 18, equally spaced longitudinally thereof, and registering holes 19 are formed in both flanges of the rim. Suitable bolts 20 pass through the registering holes and serve to secure the tire to the rim.

It will be noted that the inner face 24 of the rim is flat so that the rim and tire may be placed on any felly having a flat outer circumference and may be easily set up and removed. Radial bolts 25 passing through the rim 21 and felly 26 hold the former in place.

To put the parts in their operative relation, the cover is opened at 15, the deflated tube 1 is placed therein, the sections 16 and 17 and the grip ring are pressed together and seated in the rim section 21. The detached section 22 of the rim is now placed in position over the grip ring and this section and the tire are moved until the bolt holes register. The bolts 20 are then inserted and the nuts tightened thereon. The tire may be now inflated at the will of the operator.

Having thus described my invention, what I claim and desire to secure by Letters Patent is:

1. A tire consisting of a tube and a cover, a tread ring and a grip ring secured to the cover, layers of material covering the tire, the tread and the grip, a continuous metal sheet covering the entire tread, and spikes passing through the metal into the tread with their heads protruding.

2. An automobile tire composed of an inner air-tube and a cover therefor consisting of a tube of the same shape as the inner tube and surrounding it and split peripherally on the interior, a grip ring between the cover tube and the rim split peripherally, a tread ring on the tread side of the cover to be composed of circumferential layers of leather, and an inclosing casing covering the tread ring, the cover tube and the grip ring and split peripherally on the interior, and a metal rim composed of two parts, one of which is rigidly secured to a felly, while the other is removable and telescoped into the fixed part, and means for securing the two parts together and at the same time drawing the separated edges of the cover tube, the grip ring and the casing, as well as the separate parts of the rim, together and securing the whole.

Signed by me at Baltimore, Maryland, this 31st day of August 1908.

ROBERT J. RUTHS.

Witnesses:
 EDWARD L. BASH,
 S. RALPH WARNKEN.